United States Patent [19]

Mahlke

[11] 4,359,913

[45] Nov. 23, 1982

[54] PISTON PIN ASSEMBLY

[75] Inventor: David J. Mahlke, St. Charles, Ill.

[73] Assignee: AMSTED Industries Incorporated, Chicago, Ill.

[21] Appl. No.: 917,786

[22] Filed: Jun. 22, 1978

[51] Int. Cl.³ ............................................. G05G 1/00
[52] U.S. Cl. ................................. 74/579 E; 92/187; 403/150
[58] Field of Search ................. 74/579 R, 579 E, 594, 74/583; 308/2, 37, 67, 215; 29/113 AD, 116 AD, 117, 123, 124, 125; 92/187, 238; 403/150, 151, 152, 153

[56] References Cited

U.S. PATENT DOCUMENTS

| 1,157,130 | 10/1915 | Stebbins | 92/187 |
|---|---|---|---|
| 1,268,282 | 6/1918 | Royer | 92/187 |
| 1,365,867 | 1/1921 | Teel | 92/187 |
| 1,435,528 | 11/1922 | Keilholtz | 92/187 |
| 1,438,132 | 12/1922 | Nelson | 92/187 |
| 1,859,360 | 5/1932 | Freer | 403/150 |
| 1,887,964 | 11/1932 | Steele | 403/150 |
| 2,065,509 | 12/1936 | Bell et al. | 74/579 E |
| 2,251,714 | 8/1941 | Onions | 308/215 |
| 2,260,240 | 10/1941 | Taylor | 403/150 |
| 2,295,199 | 12/1941 | Carvelli | 92/238 |
| 2,648,122 | 8/1953 | Hornbostel | 29/123 X |
| 2,797,135 | 6/1957 | Johansson | 403/150 |
| 2,851,319 | 9/1958 | Pitner | 92/187 |
| 3,161,125 | 12/1964 | Hornbostel | 29/123 X |
| 3,702,092 | 11/1972 | Zollner | 308/2 X |

FOREIGN PATENT DOCUMENTS

| 553811 | 3/1958 | Canada | 308/215 |
|---|---|---|---|
| 601520 | 11/1933 | Fed. Rep. of Germany | 403/153 |
| 401154 | 11/1933 | United Kingdom | 403/153 |
| 528930 | 11/1940 | United Kingdom | 403/153 |

Primary Examiner—Daniel J. O'Connor
Attorney, Agent, or Firm—Tony T. Shu; Fred P. Kostka; Edward J. Brosius

[57] ABSTRACT

An improved piston pin assembly which includes a hollow tubular piston pin and one or more supports positioned within the hollow space formed by the piston pin so as to inhibit deflection of the piston pin when the assembly is subjected to load conditions.

1 Claim, 4 Drawing Figures

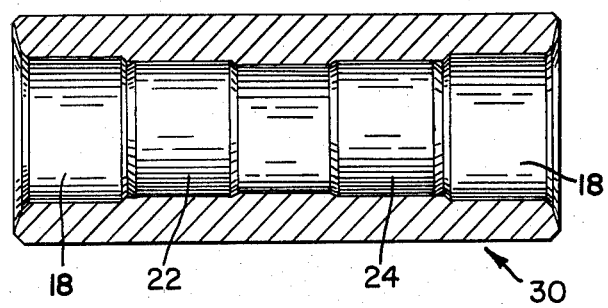
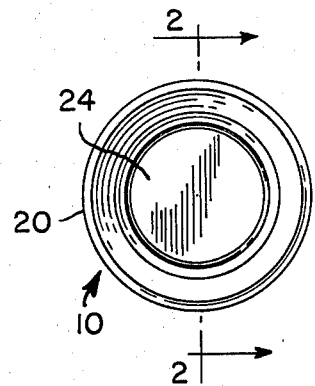
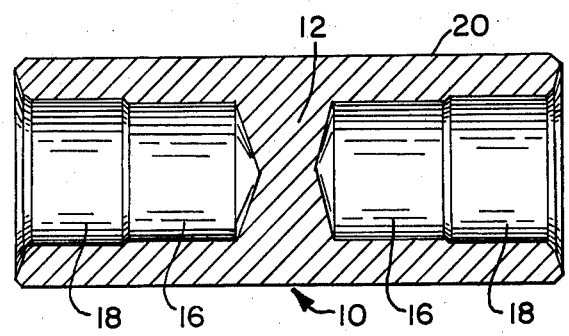
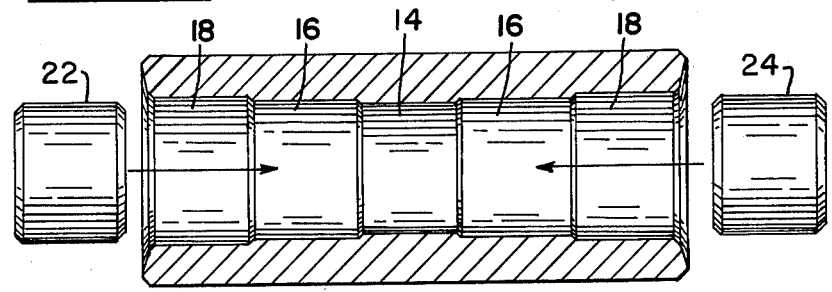

PISTON PIN ASSEMBLY

BACKGROUND AND SUMMARY OF THE INVENTION

This invention relates to an improved piston pin assembly. More particularly, the invention relates to a hollow piston pin assembly which has improved strength and durability.

Piston driven engines often employ piston pins to aid in providing communication between the pistonhead within the engine cylinder and the piston rod which acts in response to the motion of the pistonhead to supply power to the crank shaft.

Frequently, piston pins are hollow in configuration in order, for example, to reduce the weight of the reciprocating piston components. Because a hollow piston pin has a reduced strength, the forces on the pin during use result in increasing pin deflection and produce higher internal stresses. Increased pin deflection in turn causes increased bearing wear. If the deflection is of a sufficient magnitude, the pin may be permanently deformed. Pins so deformed must be replaced.

Clearly, a hollow piston pin having a configuration to minimize deflection is desirable.

Therefore, one object of the present invention is to provide an improved piston pin assembly.

Another object of the present invention is to provide an improved hollow piston pin assembly with improved strength.

A still further object of the present invention is to provide an improved hollow piston pin assembly with a reduced tendency to deflect under load conditions. Other objects and advantages of the present invention will become apparent hereinafter.

An improved piston pin assembly has now been discovered. This assembly includes a hollow tubular means, preferably substantially circular in outside cross-sectional area, which acts as the body of the piston pin. That is, the outside surface of the hollow tubular means acts in cooperation with the bearings, pistonhead and rod to facilitate the operation of the piston. In short, the hollow tubular means described above is a hollow piston pin as that term is generally used. In the present assembly, support means are positioned within a hollow space formed by the tubular means so as to inhibit deflection of the tubular means when the assembly is under load conditions, e.g. during engine operation. Thus, the present support means provides for improved piston pin strength without unduly affecting the weight reduction benefit of hollow piston pins.

In one embodiment, the support means of the present apparatus comprises at least, and preferably only, two separate plugs positioned a distance apart within the hollow space of the tubular means. These plugs are preferably positioned to support the point or points of the hollow tubular means which is subjected to maximum stress under load conditions. The outside cross-sectional area, preferably substantially circular configuration, of these plugs is substantially equal to the inside cross-sectional area, also substantially circular in configuration, of at least a portion of the hollow space of the tubular means so that each of the plugs is positioned or fits snugly into the hollow space.

The plugs are substantially cylindrical in shape and, in addition, more preferably are substantially solid, i.e. are not hollow. Solid plugs have been found to be effective to support the piston pin against deflection without unduly increasing weight included in the assembly.

In a further embodiment, the hollow space defined by the tubular means has a nonuniform cross-sectional area. Preferably the cross-sectional area of this hollow space varies in such a manner that the hollow space is substantially symmetrical with respect to shape and volume around the central axis of the tubular means. In one preferred system, two substantially identical, e.g. with respect to weight and geometry, plugs are positioned within the hollow space at points of substantially equal hollow space cross-sectional area, which area is neither the largest nor the smallest (i.e. at an intermediate cross-sectional area) within the hollow space. In a more preferred embodiment, the two plugs are positioned within the hollow space so as to be separated by a portion of the hollow space which has a smaller cross-sectional area relative to the cross-sectional area of the plugs. This feature provides additional strength to the assembly and facilitates more securely locating the plugs in the hollow space.

In general, and except as otherwise provided for herein, the assembly of the present invention may be fabricated from any suitable material or combination of materials of construction. The material of construction used for each component of the present apparatus may be dependent upon the particular application involved. Of course, the apparatus should be made of materials which are substantially unaffected, except for normal wear and tear, by the conditions at which the assembly is normally operated. Preferably, the present tubular means and supports are made of the same material of construction in order to provide maximum compatibility during manufacture and use.

These and other aspects and advantages of the present invention are set forth in the following detailed description and claims, particularly when considered in conjunction with the accompanying drawings in which like parts bear like reference numerals.

IN THE DRAWINGS

FIG. 1 is an end view of one embodiment of the piston pin assembly of the present invention.

FIG. 2 is a view, in section, taken along line 2—2 of FIG. 1.

FIG. 3 is a section view of a piston pin useful in the present apparatus at an intermediate stage of manufacture.

FIG. 4 is a view, partly in section, illustrating the positioning of supports with a hollow piston pin.

DESCRIPTION OF THE PREFERRED EMBODIMENT

Referring now to FIG. 3, a piston pin set forth generally at 10, useful in one embodiment of the present invention, is shown at an intermediate stage of manufacture. Unfinished piston pin 10 can be formed by conventional cold flow extrusion. Typical materials of construction of piston pin 10 include steel such as, for example, steels designated as SAE 1016, 1022, 5015, 8620 and the like. As seen in FIG. 3, unfinished piston pin 10 is formed with a solid central section 12, which is conveniently removed using a conventional drilling operation. FIG. 4 shows piston pin 10 with solid central section 12 removed to form a hollow cylindrically-shaped center section 14.

Piston pin 10 further includes two substantially identical, e.g. with respect to volume, hollow, cylindrically-shaped intermediate sections 16, each having substantially the same diameter, e.g. to within a tolerance of about 0.003 inch, and therefore, substantially the same cross-sectional area. As used herein, the term "cross-sectional area" refers to that area transverse to the central longitudinal axis of the component in question. Piston pin 10 may include two substantially identical hollow, cylindrically-shaped outer sections 18 which, like intermediate sections 16, each have substantially the same diameter.

After the solid central section 12 of piston pin 10 has been removed, piston pin 10 may be subjected to conventional steel hardening processing in order to meet the specifications required for engine operation. The hardened piston pin 10 is then subjected to grinding to properly size the external surface 20 of piston pin 10.

As can be seen in FIG. 4, the cross-sectional area of the hollow central section 14 is smaller than that of the intermediate sections 16. In turn, the intermediate sections 16 each have a cross-sectional area which is smaller than that of each of the outside sections 18.

Two substantially identical, with respect to weight and geometry, solid, cylindrically-shaped inserts 22 and 24 are sized by grinding so that the cross-sectional area of each is substantially equal to the cross-sectional area of intermediate sections 16. The inserts 22, 24 may be formed of a steel of like composition as the pin 10 or any other material having sufficient physical characteristics. Inserts 22 and 24 are snugly positioned, by force fitting, into each of the intermediate sections 16 as graphically depicted in FIG. 4. The final piston pin assembly, referred to generally at 30, is shown in FIG. 1. After final sizing by grinding operations, piston pin assembly 30 is ready for engine use.

It should be understood that the sections 14, 16 and 18 may have equal diameters to form a uniform opening throughout. In this case, the location of each insert 22 and 24 within the opening is controlled by using a precise assembly procedure.

Piston pin assembly 30 provides substantial weight saving benefits of hollow piston pins with improved strength and resistance to deflection. In this regard, inserts 22, 24 may be placed within the hollow space formed by piston pin 10, i.e. in intermediate sections 16, at the points of the piston pin 10 which are subject to the maximum bending stress when piston pin assembly 30 is placed under load conditions during engine operation. The presence and positioning of inserts 22, 24 in piston pin assembly 30 inhibits the deflection of piston pin 10 when the assembly is subjected to load conditions. Improved piston pin assembly life and performance is obtained through the utilization of the present invention.

While various modifications may be suggested by those versed in the art, it should be understood that I wish to embody within the scope of the patent warranted hereon, all such modifications as reasonably and properly come within the scope of my contribution to the art.

What is claimed is:

1. In a piston pin assembly particularly adapted for joining a connecting rod to a pistonhead having high performance characteristics, and improvement therein comprising, a body having an elongated cylindrical-shaped outer surface and a hollow inner space defined by a cylindrical-shaped center section of a selective length joined on each side by contiguous cylindrical-shaped intermediate sections having a diameter greater than said center section to provide stops at the juncture of said sections, said hollow inner space further being defined by cylindrical-shaped outer sections contiguous with the outer ends of each said intermediate sections, each said outer sections having a diameter greater than said intermediate sections to provide a body having a maximum deflection resistant-weight ratio, said outer and center sections being hollow, and solid cylindrical-shaped inserts tightly positioned in said intermediate section in contact with said stops to minimize deflection of said pin body upon loads being transferred between said connecting rod and said pistonhead.

* * * * *